(12) United States Patent
Ma et al.

(10) Patent No.: US 9,874,715 B1
(45) Date of Patent: Jan. 23, 2018

(54) IMAGE LENS

(71) Applicants: Jie Ma, Shenzhen (CN); Chuandong Wei, Shenzhen (CN)

(72) Inventors: Jie Ma, Shenzhen (CN); Chuandong Wei, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/358,538

(22) Filed: Nov. 22, 2016

(30) Foreign Application Priority Data

Jul. 20, 2016 (CN) .......................... 2016 1 0573794

(51) Int. Cl.
*G02B 9/00* (2006.01)
*G02B 7/02* (2006.01)
*G02B 5/00* (2006.01)

(52) U.S. Cl.
CPC ............. *G02B 7/021* (2013.01); *G02B 5/005* (2013.01)

(58) Field of Classification Search
CPC .... G02B 7/021; G02B 5/005; G02B 27/0018; G02B 13/0045; G02B 5/003
USPC ......................................... 359/740, 811–820
See application file for complete search history.

(56) References Cited

U.S. PATENT DOCUMENTS

| | | | | |
|---|---|---|---|---|
| 4,196,967 A * | 4/1980 | Ohnishi | ............. | G02B 17/0808 359/399 |
| 5,400,072 A * | 3/1995 | Izumi | ....................... | G02B 9/12 348/335 |
| 6,549,346 B2 * | 4/2003 | Wada | ..................... | G02B 7/021 359/814 |
| 6,930,840 B2 * | 8/2005 | Tohyama | ................. | G02B 1/10 359/694 |
| 7,016,126 B2 * | 3/2006 | Ogawa | .................... | G02B 7/021 359/649 |
| 7,158,318 B2 * | 1/2007 | Shirie | .................. | G02B 13/001 359/601 |
| 7,406,223 B2 * | 7/2008 | Ito | ....................... | G02B 27/0018 264/1.7 |
| 7,457,052 B2 * | 11/2008 | Hirata | ................ | G02B 27/0018 359/738 |
| 7,626,773 B2 * | 12/2009 | Noda | ..................... | G02B 7/022 359/704 |
| 7,684,124 B2 * | 3/2010 | Shinozawa | ............ | G02B 5/003 359/738 |
| 7,787,198 B1 * | 8/2010 | Xu | ......................... | G02B 7/021 359/819 |
| 7,903,355 B2 * | 3/2011 | Abe | ....................... | G02B 7/021 348/373 |

(Continued)

*Primary Examiner* — James Greece
(74) *Attorney, Agent, or Firm* — Na Xu; IPro, PLLC

(57) ABSTRACT

An imaging lens is disclosed and has an optical axis. The image lens includes a lens barrel having a lens barrel wall arranged around the optical axis and forming an accommodation space; an imaging module including a plurality of near object units and near image units separated from each other and arranged in an order from an object side to an image side in the accommodation space; and a spacing part sandwiched between the near object units and the near image units. The spacing part includes a first reflecting surface facing the near image units and a second reflecting surface connected with the first reflecting surface, the light from the near image units is reflected two times by the first reflecting surface and the second reflecting surface.

7 Claims, 2 Drawing Sheets

(56) References Cited

U.S. PATENT DOCUMENTS

| | | | | |
|---|---|---|---|---|
| 7,969,667 | B2 * | 6/2011 | Sodeyama | G02B 7/021 359/740 |
| 8,320,059 | B2 * | 11/2012 | Lin | G02B 5/003 359/740 |
| 8,526,129 | B2 * | 9/2013 | Hirata | G02B 7/021 359/819 |
| 8,570,672 | B2 * | 10/2013 | Lin | G02B 7/021 359/738 |
| 8,810,933 | B2 * | 8/2014 | Jeong | B29D 11/00375 359/811 |
| 8,967,814 | B2 * | 3/2015 | Chang | G02B 7/021 359/601 |
| 8,985,789 | B2 * | 3/2015 | Cho | G02B 27/0018 359/601 |
| 9,042,040 | B2 * | 5/2015 | Kim | G02B 3/08 359/741 |
| 2015/0022896 | A1 * | 1/2015 | Cho | G02B 13/0035 359/601 |
| 2015/0198779 | A1 * | 7/2015 | Cho | G02B 13/0035 359/601 |
| 2016/0349504 | A1 * | 12/2016 | Kim | G02B 27/0018 |

* cited by examiner

IMAGE LENS

FIELD OF THE INVENTION

The present disclosure relates cameras, especially relates to an imaging lens which can eliminate stray light.

DESCRIPTION OF RELATED ART

The imaging lens is an important optical component in camera imaging devices. The optical performance of the imaging lens has big influence on imaging quality. General imaging lens mainly includes a lens barrel, a plurality of (two or more) imaging modules and a plurality of spacing modules. Imaging modules are installed inside the lens barrel and the spacing modules can be installed between the lens barrel and the imaging module or between two adjacent imaging modules. When the emitted or reflected light from the object side of the imaging lens enters the lens barrel, the image is formed by the imaging lens on the imaging surface at the image side of the imaging module.

However, because the spacing part has a certain thickness, the stray light reflected from the spacing module's internal wall may go to the image side surface of the lens and then create flare or ghost. Especially for the imaging module closest to the object side, the stray light created by the spacing part has more serious affect.

In related technologies, referring to FIG. 1, an imaging lens 2 includes a lens barrel 21, a plurality of lenses 22 installed along the optical axis in the lens barrel 21. In order to eliminate the affect of the stray light created by the plastic spacing part 23 reflected from the lens 22 closest to the object side, a plastic spacing part 23 and punched spacing part 24 are installed between the lens 22 and adjacent lens 22 from the object side to the image side. The punched spacing part 24 eliminates the stray light reflected from the lens 22 closest to the image side to the plastic spacing part 23. Such a mode can eliminate the stray light reflected from the lens 22 closest to the image side to the plastic spacing part 23 to a certain degree, but this mode has weak light absorption and cannot eliminate completely the stray light reflected from the lens 22 closest to the image side to the plastic spacing part 23, and the structure is too complex, not conducive to reduce the cost.

Therefore, it is necessary to provide an improved image lens to overcome above disadvantage.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain this disclosure, not intended to limit this disclosure.

Figure 1:
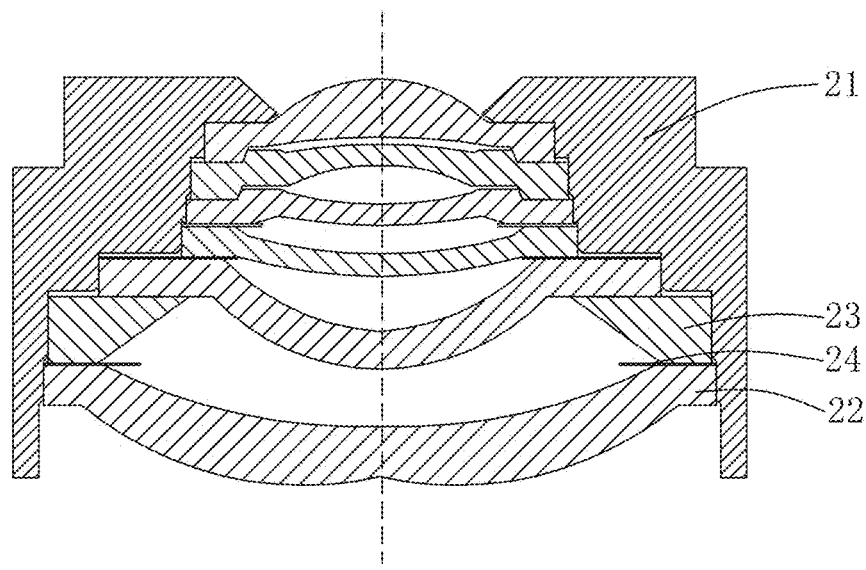
FIG. 1 is an illustration of an image lens related to the present disclosure.
Figure 2:
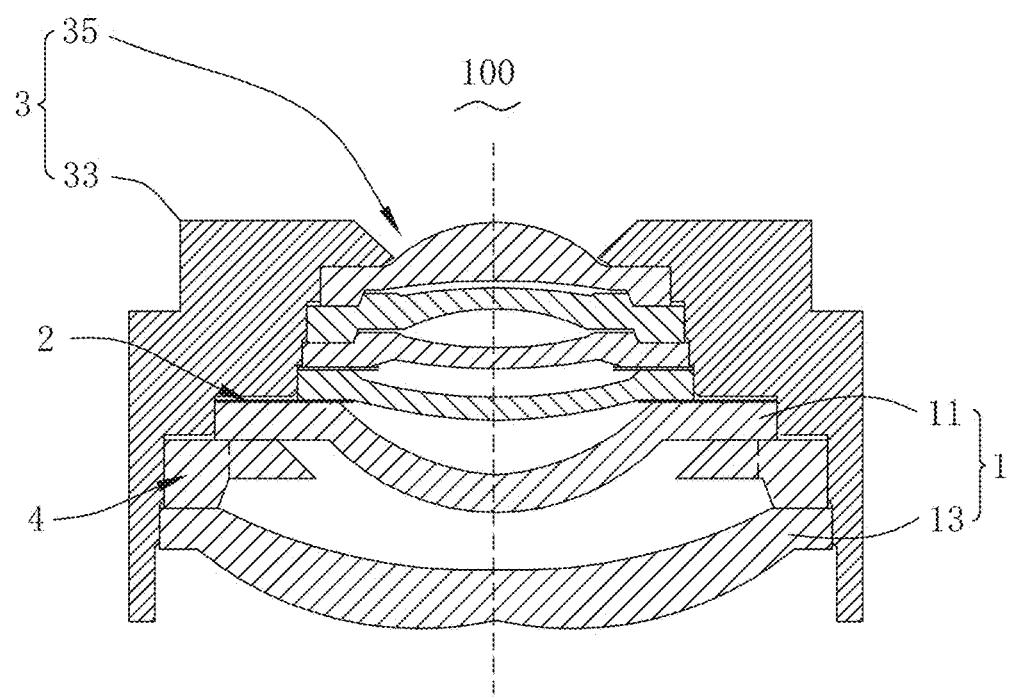
FIG. 2 is an illustration of an image lens in accordance with an exemplary embodiment of the present disclosure.

Referring to FIG. 2 an imaging lens 100 in accordance with an exemplary embodiment of the present disclosure, includes an imaging module 1, a punched spacing part 2, a lens barrel 3 having an accommodation space and a spacing part 4.

The imaging module 1 includes near object units 11 and near image unit 13. Five near object units 11 and one near image unit 13 are provided. The near object units 11 and the near image unit 13 are separated from each other and installed in an order from the object side to the image side in the accommodation space 35. The spacing part 4 is installed between the near image unit 13 and adjacent the near object units 11. The imaging module 1 in this embodiment is a lens. In this embodiment, there are 5 near object units 11 and 1 near image unit 13. In other embodiments, the numbers of the near object unit 11 and the near image unit 13 can be set freely according to need. The spacing part can also be freely installed between any two of the near object units 11 and between any two of the near image units 13.

In this embodiment, there are 2 punched spacing parts. The punched spacing parts 2 are clamped between two adjacent near object units 11.

Figure 3:
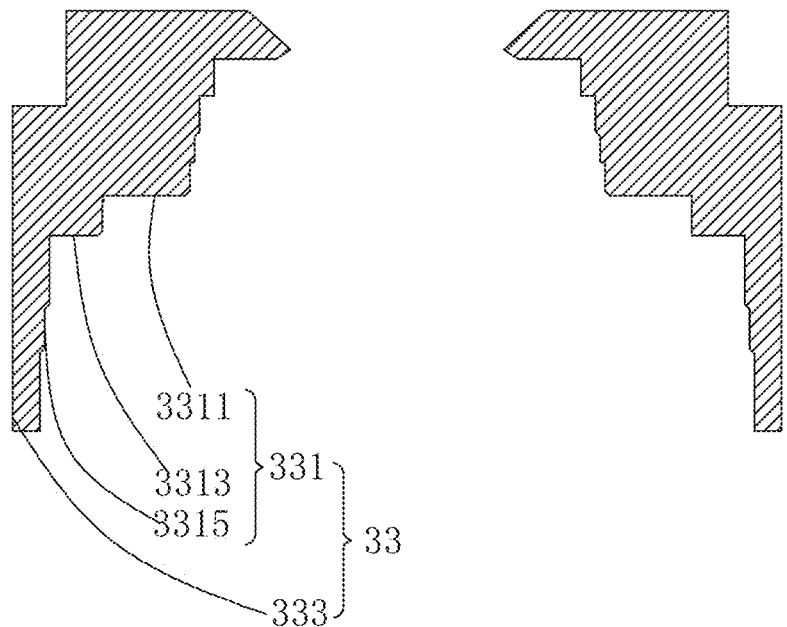
FIG. 3 is an illustration of a lens barrel of the image lens in FIG. 2.
Figure 4:
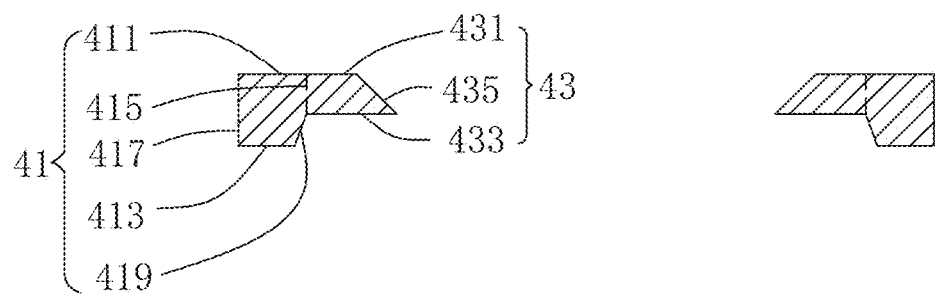
FIG. 4 is an illustration of a spacing part of the image lens in FIG. 1.

Referring to FIGS. 2-4, the lens barrel 3 includes a lens barrel wall 33 and an accommodation space 35. The optical axis and the central axis of the lens barrel 3 are aligned. The lens barrel wall 33 is arranged around the optical axis and forms the accommodation space 35. The lens barrel wall 33 includes an internal surface 331 and an external surface 333 opposite to the internal surface 331. The internal surface 331 includes an inner face 3311 attached with the near object unit 11, a step surface 3313 extending from the inner face 3311 toward the direction away from the optical axis, and a wall surface 3315 which extends from the step surface 3313 toward the direction away from the inner face 3311 and which is attached with the spacing part 4 and the near image unit 13.

The spacing part 4 includes a fixing portion 41 fixed on the lens barrel wall 33 and an extending portion 43 extending from the fixing part 41 toward the optical axis.

The fixing part 41 includes a first fixing surface 411, a second fixing surface 413, an extension wall 415, an attaching wall 417 and a second reflecting surface 419. The first fixing surface 411 and the second fixing surface 413 are installed opposite to the fixing portion 41 along the direction from the object side to the image side. The first fixing surface 411 is separated with the step surface 3313. The second fixing surface 413 is attached with the near image unit 13. The extension wall 415 extends from the first fixing surface 411 toward the second fixing surface 413, and not yet up to the second fixing surface 413. The horizontal distance from the extension wall 415 to the optical axis is less than the horizontal distance from the external side of the near object unit 11 adjacent to the near image unit 13 to the optical axis. The second reflecting surface 419 is located on the fixing part 41 and extends un-straightly from the second fixing surface 413 to the optical axis toward one end of the extension wall 415 close to the near image unit 13. The attaching wall 417 and the extension wall 415 are installed opposite each other, connecting the first fixing surface 411 and the second fixing surface 413. The attaching wall 417 and the wall surface 3315 are attached. The second reflecting surface 419 is a slope surface.

The extending part 43 includes an upper surface 431, the first reflecting surface 433 and a slope wall 435. The extending portion 43 and the fixing portion 41 are molded together. The upper surface 431 extends from one end of the extension wall 415 close to the near object unit 11 toward the optical axis 31. The upper surface 431 and the first fixing surface 411 are on same plane. The upper surface 431 is attached with the near object unit 11 adjacent to the near image unit 13. The first reflecting surface 433 is located on the extending portion 43 and extends from one end of the extension wall 415 close to the near image unit 11 toward the optical axis. The slope wall 435 extends from the upper surface 431 toward the direction close to the optical axis 31, connects the upper surface 431 and the first reflecting surface 435. The first reflecting surface 433 is a horizontal plane. The angle between the first reflecting surface 433 and the second reflecting surface 419 is an obtuse angle.

In the embodiment, the spacing part 4 is made of plastic. Compared with the relevant technology, the imaging lens 100 disclosed in the present invention has following beneficial effects:

1. The first reflecting surface 433 and the second reflecting surface 419 are matched, so that the light from the near image unit 13 to the spacing part 4 is reflected two times, that dramatically the light absorption of the spacing part 4 increases and the stray light reflected from the spacing part 4 is eliminated to the greatest degree;

2. The first reflecting surface 433 is a horizontal plane and the second reflecting surface 419 is a slope surface, in favor of light extinguishing, also increasing the light absorption of the spacing part 4;

3. The imaging lens 100 by installing a structure of the spacing part 4 replaces the complex structure composed of plastic spacing part and punched spacing part in related technology, so that the imaging lens 100 can be shaped easily, the cost of material can be reduced.

The imaging module 1 in this embodiment is a lens and the spacing part 4 is made of plastic.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An imaging lens having an optical axis, including:
a lens barrel having a lens barrel wall arranged around the optical axis and forming an accommodation space;
an imaging module including a plurality of near object units and near image units separated from each other and arranged in an order from an object side to an image side in the accommodation space;
a spacing part sandwiched between the near object units and the near image units; wherein
the spacing part includes a first reflecting surface facing the near image units and a second reflecting surface connected with the first reflecting surface, the light from the near image units is reflected two times by the first reflecting surface and the second reflecting surface.

2. The imaging lens as described in claim 1, wherein the first reflecting surface is a horizontal plane and the second reflecting surface is a slope plane.

3. The imaging lens as described in claim 2, wherein an angle between the first reflecting surface and the second reflecting surface is an obtuse angle.

4. The imaging lens as described in claim 2, wherein the spacing part includes a fixing portion fixed on the lens barrel wall and an extending portion extended from the fixing portion toward the optical axis; the fixing portion includes a first fixing surface, a second fixing surface opposite to the first fixing surface, and an extension wall extending from the first fixing surface toward the second fixing surface; the first reflecting surface is located on the extending portion and extends from the one end of the extension wall close to the near image units toward the optical axis; the second reflecting surface is located on the fixing portion and inclines and extends from the second fixing surface to the optical axis toward an end of the extension wall close to near image units.

5. The imaging lens as described in claim 4, wherein the extending portion is further provided with an upper surface extending from an end of the extension wall close to near object units toward the optical axis and a slope wall connecting the upper surface and the first reflecting surface; the slope wall extends from the supper surface along a direction close to the optical axis.

6. The imaging lens as described in claim 5, wherein the lens barrel wall includes an inner face attached to the near object unit, a step surface extending from the inner face away from the optical axis, and a wall surface extending from the step surface away from the inner face and attached to the spacing part and the near image units; the first fixing face is separated from the step surface and the upper surface is attached to the near object unit.

7. The imaging lens as described in claim 4, wherein the first fixing face and the upper surface are co-planar with each other.

* * * * *